United States Patent [19]
Jinsenji et al.

[11] 3,769,464
[45] Oct. 30, 1973

[54] METHOD AND APPARATUS FOR MAINTAINING ALIGNMENT BETWEEN A TAPE RECORDER HEAD AND A TRACK OF RECORDED MATERIAL ON A MAGNETIC TAPE

[75] Inventors: Sei Jinsenji; Teruo Kawata, both of Tokyo, Japan

[73] Assignee: Kabushiki Kaisha Ricoh, Tokyo, Japan

[22] Filed: Dec. 20, 1971

[21] Appl. No.: 209,522

[30] Foreign Application Priority Data

Dec. 26, 1970 Japan .............................. 45/125932

[52] U.S. Cl. ................. 179/100.2 S, 179/100.2 CA, 340/174.1 C
340/174.1 B

[51] Int. Cl. ........................ G11b 21/10, G11b 5/58

[58] Field of Search ............ 179/100.2 CA, 100.2 S, 179/100.2 MD, 100.2 K; 340/174.1 C, 174.1 B, 174.1 H, 174.1 K

[56] References Cited

UNITED STATES PATENTS

| | | | |
|---|---|---|---|
| 3,023,404 | 2/1962 | Dickerson | 340/174.1 R |
| 3,246,307 | 4/1962 | Stanley | 340/174.1 C |
| 3,586,337 | 6/1971 | Guttinger | 179/100.2 CA |
| 3,292,168 | 12/1966 | Gray | 340/174.1 C |
| 3,474,432 | 10/1969 | Sevilla | 340/174.1 B |
| 3,258,750 | 6/1966 | Shew | 340/174.1 C |
| 3,672,685 | 6/1972 | Tolar | 179/100.2 C |
| 3,271,034 | 9/1966 | Andrews | 179/100.2 CA |
| 3,538,779 | 11/1970 | Yamamoto | 179/100.2 CA |

*Primary Examiner*—Terrell W. Fears
*Assistant Examiner*—Alfred H. Eddleman
*Attorney*—Henry T. Burke et al.

[57] ABSTRACT

Apparatus and method whereby a magnetic reproducing head comprising a head element for controlling the vertical position of the head relative to a track of recorded material on a magnetic tape and a head element for reproducing the recorded material and disposed on a pivotal lever maintained in a balanced position by the electromagnetic force of electromagnetic means and the biasing force of a spring can be kept in alignment with the track of recorded material at all times. A tracking error produces a change in the relative positions of the track of recorded material and the vertical position control head element and causes a magnetic variation to occur. The magnetic variation is detected by the vertical position control head element which accordingly controls the electromagnetic force of the electromagnetic means so as to bring the reproducing head back into alignment with the track of recorded material. When the magnetic tape used is an endless tape carrying multiple tracks of recorded material which are continuous with one another through an inclined track portion, it is possible to automatically switch the reproducing head from one track to another as the electromagnetic force of the electromagnetic means is increased when the position control head element is brought into alignment with the inclined track portion.

14 Claims, 10 Drawing Figures

INVENTORS
SIE JINSENJI
TERUO KAWATA

BY Henry T. Burke
ATTORNEY

INVENTORS
SIE JINSENJI
TERUO KAWATA

BY Henry T. Burke
ATTORNEY

METHOD AND APPARATUS FOR MAINTAINING ALIGNMENT BETWEEN A TAPE RECORDER HEAD AND A TRACK OF RECORDED MATERIAL ON A MAGNETIC TAPE

BACKGROUND OF THE INVENTION

This invention relates to apparatus and method of automatically obtaining and maintaining the alignment of a reproducing head of a tape recorder, particularly, a video tape recorder, with a track of recorded material on a magnetic tape.

When material recorded in a magnetic tape is reproduced by means of a tape recorder, it is essential that the reproducing head should be accurately maintained in alignment with a track of recorded material on the tape at all times. In other words, the reproducing head must be made to faithfully follow a predetermined path on the tape irrespective of the vertical displacements of the tape which might be caused, for example, by vibration of the tape recorder during the movement of the tape.

The number of tracks recorded by magnetic recording systems on a tape has in recent years shown a tendency to increase. With this tendency, the width of each track and the track pitch have inevitably been reduced. For example, when 12 tracks are recorded on a conventional magnetic tape of 6.25 mm. wide by using the tape as a video tape, each track has a width of 0.3mm. with a track pitch of 0.2mm. It will be evident that any means provided for maintaining the reproducing head in alignment with one of these tracks at all times must be high in efficiency and reliable in performance.

The mechanical means of the prior art designed to accomplish the aforesaid object have been generally unsatisfactory in causing the reproducing head to accurately follow a predetermined path at all times. Tracking errors often take place in reproducing recorded material on the magnetic tape by using a conventional tape recorder.

SUMMARY OF THE INVENTION

An object of this invention is to provide apparatus and method of automatically controlling the position of a reproducing head of a tape recorder with respect to a magnetic tape so that the alignment of the head with a track of recorded material on the tape can be maintained at all times. To this end, the reproducing head used in the apparatus and method according to this invention comprises a magnetic recording and reproducing head element and a head element for controlling the vertical position of the head relative to a track of recorded material on a tape which is adapted to be automatically disposed in a predetermined relative position with respect to the track on the tape. The head constructed as aforesaid is supported by a lever and pulled by the biasing force of a spring in a direction which is normal to the direction of movement of the track on the tape disposed in a vertical plane. The lever is also acted on by electromagnetic means whose electromagnetic force is controlled by an output signal produced by the vertical position control head element. The reproducing head can be maintained in alignment with the track when the lever is maintained in a balanced position by the biasing force of the spring and the electromagnetic force of the electromagnetic means.

If a tracking error occurs, a vertical displacement of the reproducing head with respect to the track on the tape is detected by the vertical position control head element which issues a signal to the electromagnetic means to actuate the same so as to bring the lever to an unbalanced position whereby the reproducing head is made to follow the track of recorded material. When the reproducing head is brought into alignment with the track again, the lever is restored to the balanced position.

This causes the reproducing head to follow the track of recorded material on the magnetic tape at all times at high efficiency.

A second object of this invention is to provide a method of automatically permitting the recording and reproducing head to switch from one track of recorded material to another on a magnetic tape by utilizing a signal produced by the vertical position control head element for actuating the electromagnetic means when the magnetic tape is an endless tape carrying multiple tracks of recorded material.

Other and further objects are those inherent in the invention herein illustrated, described and claimed, and will become apparent as the description proceeds.

BRIEF DESCRIPTION OF THE DRAWINGS

FIG. 1(*a*) showing the vertical position control head element being in engagement with an upper marginal portion of the track, FIG. 1(*b*) showing the vertical position control element in a position in which its lower edge is disposed on an upper edge of the track, FIG. 1(*c*) showing the vertical position control head element being disposed in a position in which it is spaced apart from the track and FIG. 1(*d*) showing the vertical position control head element being disposed in a position in which it is disposed on an inclined track portion of one of a plurality of tracks on a magnetic tape of the multiple track magnetic recording system.

DESCRIPTION OF PREFERRED EMBODIMENTS

Figure 1A:
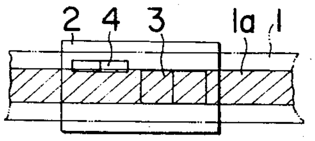
FIG. 1, which is composed of FIGS. 1(*a*), 1(*b*), 1(*c*) and 1(*d*), shows the relative positions of the reproducing head used in the apparatus and in carrying out the method according to this invention and a track of recorded material on a magnetic tape.
Figure 1B:
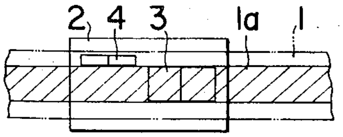
Figure 1C:
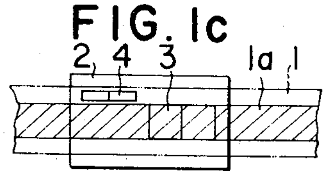
Figure 1D:
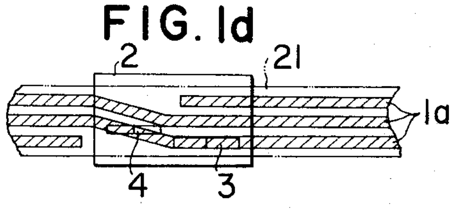
Figure 2:
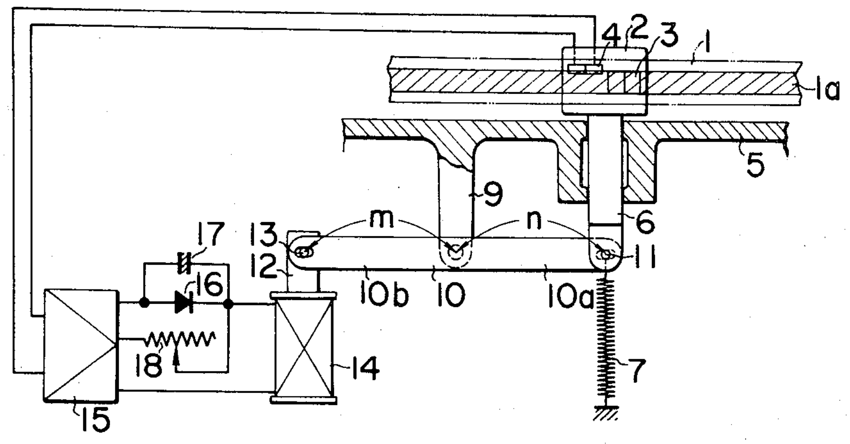
FIG. 2 is a schematic view of one example of the automatic magnetic recording and reproducing head aligning device adapted for carrying into practice the method of automatically obtaining and maintaining the alignment of a tape recorder head with a track of recorded material on a magnetic tape according to this invention.

FIG. 2 shows one example of the automatic magnetic recording and reproducing head aligning device adapted to accomplish the first object of this invention. A reproducing head 2 adapted to come into engagement with a magnetic tape 1 is shown as comprising a reproducing head element 3 and a vertical position control head element 4. The two head elements 3 and 4 each consist of an actuating coil wound on a core as is well known. The core of reproducing head element 3 has a vertical dimension which is identical with the width of a track of recorded material, while the core of vertical position control head element 4 is smaller than the width of the track as shown.

When this invention is carried into practice with a tape recorder using a magnetic tape carrying multiple tracks of recorded material, the core of vertical position control head element 4 has a vertical dimension which is identical with the track pitch of the tracks on the tape.

The relative positions of the cores of the two head elements are such that when the core of reproducing head element 3 is accurately aligned with a track 1*a* of recorded material as shown in FIG. 1(*a*), a lower marginal portion of vertical position control head element 4 overlaps an upper marginal portion of the track 1*a* a predetermined amount.

Referring to FIG. 2 again, reproducing head 2 is disposed fixedly on top of a rod 6 supported for vertical sliding motion with respect to a body 5 of the device, so that reproducing head 2 acts as a unit with rod 6 which is biased downwardly by the resilient force of a spring 7.

A pin 11 attached to a lower portion of rod 6 is received in a slot formed at one end portion of one arm 10*a* of a lever 10 pivotally supported at its geometric center by a supporter 9. Lever 10 has the other arm 10*b* formed at its end portion with a slot for receiving therein a pin 13 attached to an electromagnetic plunger 12 of electromagnetic means.

The two pins 11 and 13 are equidistantly disposed with respect to the geometric center or fulcrum of lever 10. Assuming that the distance between the fulcrum and pin 11 is $n$ and the distance between the fulcrum and pin 13 is $m$, the lever ratio is 1:1 because $n = m$. However, the lever ratio can be determined arbitrarily in accordance with the relation between the biasing force of spring 7 and the electromagnetic force of electromagnetic plunger 12.

A coil 14 for actuating electromagnetic plunger 12 is connected to the output of an amplifier 15 which is adapted to amplify an output signal of vertical position control head element 4 to supply the amplified output to the coil 14 for actuating electromagnetic plunger 12. The output of amplifier 15 is rectified by a rectifier 16 and a capacitor 17, and the initial starting position of reproducing head 2 with respect to track 1a is adjusted by a resistor 18 before the output is supplied to coil 14.

In a device constructed as aforementioned the electromagnetic force of the electromagnetic means and the biasing force of spring 7 are equal to each other and lever 10 is in the balanced position when the following relation holds at the initial stage of travel of tape 1:

$$mB\,lI \leqq n([(\tau\pi d^3)/(k8D)] + M) \qquad (1)$$

where

*B:* The Density of Magnetic Flux of the Electromagnetic Plunger
*L:* The Length of the Coil for Actuating the Electromagnetic Plunger
*I:* The Electric Current Exciting the Coil for Actuating the Electromagnetic Plunger
*D:* The Mean Diameter of the Spring
*d:* The Diameter of the Spring Material
*k:* D/d
$\tau$ : The Shearing Stress
*M:* The Mass of the Head and Head Rest
*n, m:* The Lever Ratio The left member of equation (1) represents the electromagnetic force, and the right member thereof represents the biasing force of the spring.

In the aforementioned device, an electromagnetic force and a biasing force which satisfy equation (1) are exerted on lever 10. Normally, tape 1 is moved while lever 10 is in this position.

However, if tape 1 is deflected downwardly relative to reproducing head 2 by some cause, the output signal produced by vertical position control head element 4 is reduced in value and consequently the electromagnetic force of the electromagnetic means is also reduced, thereby throwing lever 10 off balance because the biasing force of spring 7 becomes greater than the electromagnetic force. This causes reproducing head 2 to move downwardly with respect to tape 1.

Downward movement of reproducing head 2 brings vertical position control head element 4 into engagement with track 1a of recorded material again, with the result that the output signal of element 4 is increased in value and consequently the electromagnetic force of the electromagnetic means is also increased, thereby restoring lever 10 to the balanced position.

Figure 3:
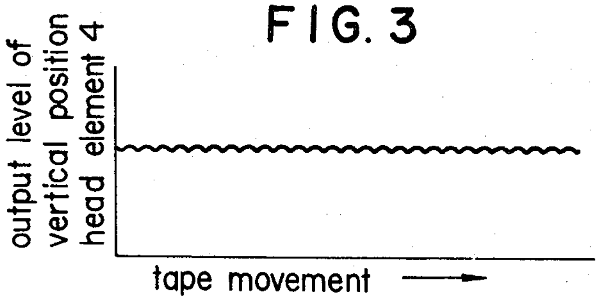
FIG. 3 shows a curve representing the characteristics of the output level of the vertical position control head element with respect to the movement of the tape.

Restoration of lever 10 to the balanced position causes reproducing head 2 to move upwardly and the output signal of head element 4 is reduced in value again, so that lever 10 is brought to the unbalanced position again. Accordingly, the output level of vertical position control head element 4 shows minute fluctuations as shown in FIG. 3, and lever 10 is repeatedly moved in minute vibratory motion by the electromagnetic force of the electromagnetic means which is controlled by the output signal of head element 4 shown in FIG. 3.

The movements of reproducing head 2 which take place in slaved relation with tape 1 are caused to occur momentarily by the electromagnetic force. Thus, this invention is effective to eliminate the danger that the tape is displaced a large amount and interrupts the playback of recorded material, making it possible to faithfully reproduce recorded material.

Conversely, if tape 1 is deflected upwardly relative to reproducing head 2, the output signal of vertical position control head element 4 increase in value, so that the electromagnetic force of the electromagnetic means increases and lever 10 moves between its unbalanced position and balanced position repeatedly. More specifically, when the electromagnetic force increases and lever 10 is brought to the unbalanced position, reproducing head 2 moves upwardly in slaved relation with track 1a; when the output signal of vertical position control signal 4 is reduced in value; lever 10 is restored to the balanced position. Thus, lever 10 moves between these two positions while moving in minute vibratory motion.

It will be seen that the apparatus and method provided by this invention are high in response to permit correction of tracking errors and to obtain and maintain the alignment of the reproducing head with the track of recorded material on the magnetic tape at all times at high efficiency.

In the embodiment described above, vertical position control head element 4 has been shown and described as overlapping the upper marginal portion of track 1a a predetermined amount when the former is in the normal position. It is to be understood, however, that this invention is not limited to this specific position of vertical position control head element 4. If means is provided whereby the track 1a of recorded material on tape is precluded from deflecting downwardly relative to reproducing head 2 or if stoppers, for example, are provided on opposite sides of reproducing head 2 for preventing downward displacements of the tape, vertical position control head element 4 may be disposed on or spaced apart from the upper edge of track 1*a* of recorded material on tape 1 as shown in FIG. 1(*b*) or FIG. 1(*c*) respectively in its normal position, so that head element 4 can correct only upwardly directed deviation of tape 1. Conversely, if upward displacement of the tape is prevented, vertical position control element 4 may be positioned at the lower margin or below track 1a of tape 1.

The operation of head element 4 disposed in the positions shown in FIG. 1(*b*) and FIG. 1(*c*) should be obvious in view of the description of operation thereof disposed as shown in FIG. 1(*a*). Therefore, description of the operation of head element 4 disposed in the positions shown in FIG. 1(*b*) and FIG. 1(*c*) is omitted in the interest of brevity.

Assuming that the output signal of vertical position control head element 4 continues to increase in value, lever 10 is thrown off balance to a great extent and the relative magnitudes of forces can be expressed by the following formula:

$$mB\ l\ IAReff \geqq n([\tau\pi d^3/k8D + K[Gd^4/8ND^3]) + M \qquad (2)$$

where

- B: The Density of Magnetic Flux of the Electromagnetic plunger
- *l:* The Length of the Coil for Actuating the Electromagnetic Plunger
- *I:* The Electric Current Exciting the Coil for Actuating the Electromagnetic Plunger
- Reff: Rectifying Efficiency
- *D:* The Mean Diameter of the Spring
- *d:* The Diameter of the Spring Material
- *k:* D/d
- *τ*: The Shearing Stress
- *G:* The Shearing Modulus
- *N:* The Effective Number of Spring Turns
- *K:* The Distance of Movement of the Head
- *M:* The Mass of the Head and Head Rest
- *n, m:* The Lever Ratio
- *A:* The Degree of Amplification of the Amplifier It will be readily seen that the electromagnetic force of the electromagnetic means represented by the left member of formula (2) can be greater in value than the biasing force of the spring represented by the right member of formula (2). When this relation prevails, the reproducing head moves a great distance.

The second object of this invention is to switch the reproducing head from one track to another of multiple tracks of recorded material carried by the endless tape by causing the reproducing head to move a great distance as aforementioned.

More specifically, multiple tracks of recorded material carried by an endless tape are connected to each other such that the lowermost track is connected by an inclined track portion to a track disposed directly above the lowermost track as shown in FIG. 1(*d*). If reproducing head 2 is brought into engagement with an endless tape 21 carrying multiple tracks arranged as aforesaid, the input to vertical position control head element 4 gradually increases in value as tape 21 is transported when head element 4 is brought into alignment with the inclined track portion. Consequently, the electromagnetic force of the electromagnetic means controlled by the output signal of head element 4 also continues to increase, so that the reproducing head is moved upwardly into engagement with a track disposed immediately above the track which it has followed up to that moment. Therefore, if means is provided to maintain the reproducing head in a position in which it is in alignment with the track to which it has just been switched, it will be possible to automatically switch the reproducing head successively from one track to another of the multiple tracks on the endless tape.

Figure 4:
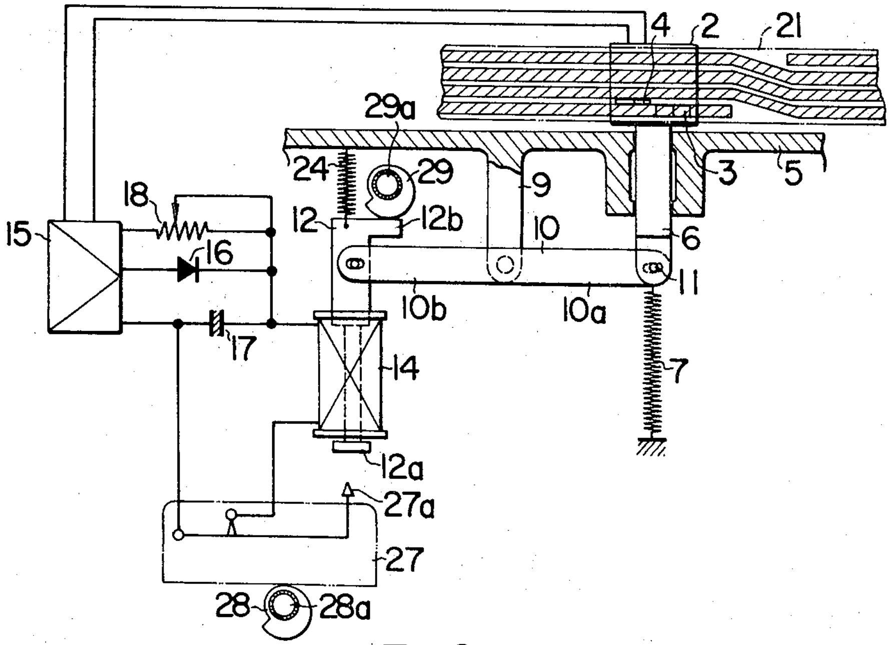
FIG. 4 is a schematic view of one example of a device for automatically switching the magnetic recording and reproducing head from one track of recorded material to another on an endless magnetic tape carrying multiple tracks adapted to carry out the method according to this invention.

FIG. 4 shows one example of the device for automatically switching the magnetic recording and reproducing head from one track of recorded material to another on the endless tape. The device shown in FIG. 4 is similar to the device shown in FIG. 3 except for the fact that the electromagnetic means for switching the reproducing head from one track to another of FIG. 4 differs from that of FIG. 3.

Figure 6:
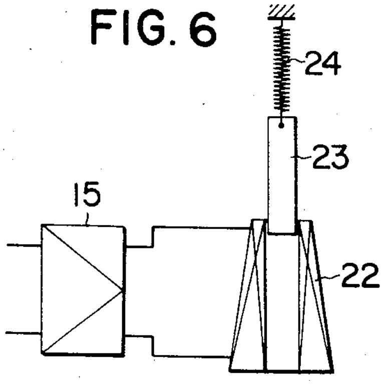
FIG. 6 is a schematic view of one example of the recorded material track switching electromagnetic means for the reproducing head of the device of FIG. 4.

More specifically, the electromagnetic means of the device of FIG. 4 has, as shown in FIG. 6, an actuating coil 22 which has a length greater than that of known coils and a diameter which increases in going in a direction in which a plunger 23 is pulled by the electromagnetic force. Thus, plunger 23 is urged in the initial stages by the biasing force of a spring 24 to move to a position in which its forward end is disposed near a minor diameter end of coil 22.

In the electromagnetic means constructed as aforesaid, the greater the diameter of coil 22, the greater the density of magnetic flux thereof. Therefore, plunger 23 is moved by the electromagnetic force toward coil 22 and its forward end enters coil 22 a predetermined distance against the biasing force of spring 24 each time the electric current passed to the coil undergoes a change in value.

Figure 5:
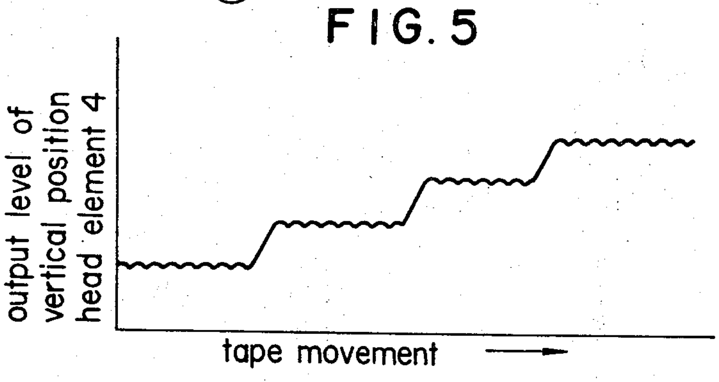
FIG. 5 shows a curve representing the characteristics of the output level of the vertical position control head element with respect to the movement of the endless tape in the device of FIG. 4.

It is when vertical position control head element 4 is brought into alignment with the inclined track portion of multiple tracks 1*a* on the endless tape that the electric current supplied to coil 22 undergoes a change in value. Therefore, the output level of head element 4 undergoes changes as shown in FIG. 5 and reproducing head 2 moves as indicated by variations in the output level of head element 4, so that head 2 is switched to a next higher adjacent track.

Figure 7:
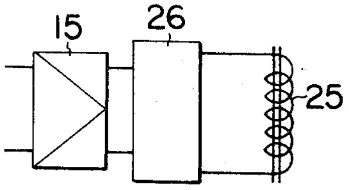
FIG. 7 is a schematic view of another example of the electromagnetic means of FIG. 6.

It is to be understood that this invention is not limited to the specific electromagnetic means shown and described herein for maintaining reproducing head 2 in a position in which it is in alignment with a track after being switched from the adjacent track through the inclined track portion. Instead, a known electromagnetic plunger 25 shown in FIG. 7 may be used in electromagnetic means in which a memory 26 is inserted between plunger 25 and amplifier 15 so that the memory may store information on the current or voltage for maintaining reproducing head 2 in a position in which it is aligned with a track after being switched from the adjacent track.

The device shown in FIG. 4 is constructed such that the initial starting position and final terminating position of reproducing head 2 can be adjusted from outside. More specifically, the actuating coil 14 of the electromagnetic means is connected to vertical position control element 4 through a normally closed limit switch 27 which is adapted to be moved up and down by a cam 28 so as to thereby adjust the distance between a limit switch actuator 27*a* and a forward end 12*a* of plunger 12. A rear end 12*b* of plunger 12 is adapted to be moved by another cam 29 against the biasing force of spring 24 so as to vary the distance plunger 12 enters actuating coil 14. Cams 28 and 29 can be turned by knobs 28*a* and 29*b* respectively which are exposed to the view of the operator.

In this arrangement, it is possible to adjust as desired the starting position of reproducing head 2 by turning cam 29 and to select as desired the position in which reproducing head 2 is caused to stop by shifting limit switch 27 by turning cam 28.

It is also possible to selectively reproduce material recorded on any track or tracks of a plurality of tracks carried by the endless tape by using this automatic switching device by positioning reproducing head 4 on a selected track which is to be reproduced first, by means of turning the knob 29*a* suitably and by setting the cam 28 by the knob 28*a* to define a selected track which is to be reproduced last. More specifically, when reproducing head 2 moves upwardly to a predetermined position, the forward end 12*a* of plunger 12 opens limit switch 27 and the electromagnetic force is removed thereby. Thus, reproducing head 2 is automatically moved by the biasing force of spring 24 to the predetermined position.

We claim:

1. Apparatus for maintaining a normal vertical alignment position between a magnetic head and a recording track of magnetically recorded information on a magnetic tape transported horizontally with respect to the head comprising:

a vertical position control head element affixed to the head and disposed at a defined vertical position with respect to the track when the head is at said normal vertical alignment position with respect to the track, said control head element being responsive to a defined vertical displacement of the control head element from said defined vertical position with respect to the track to generate a control signal varying as a function of the degree and sense of said vertical displacement, said control head element being distinct from said magnetic head, and said control signal being distinct and different from any signals provided by said magneic head; and head positioning means connected to said magnetic head and connected to receive said control signal and responsive to defined variations in said control signals to move the head toward said normal vertical alignment position with respect to the track of magnetically recorded information.

2. Apparatus as in claim 1 wherein said head positioning means includes an electromagnetic means having a plunger and responsive to said control signal to move the plunger along a distance defined by the magnitude of the control signal, and means connecting the plunger and the head to move the head vertically in response to said plunger movement.

3. Apparatus as in claim 2 wherein said plunger moves in a defined direction in response to an increase in the magnitude of said control signal and wherein a bias spring means is provided for biasing the head toward a direction opposite that in which the head is moved by the electromagnetic means in response to an increase in the magnitude of said control signal.

4. Apparatus as in claim 2 including a centrally pivoted horizontal lever having one arm connected to the head, a bias spring biasing said arm downwardly, means connecting the electromagnetic means plunger to the other arm of the lever, said electromagnetic means moving the plunger downwardly in response to an increase in the magnitude of said control signal and thereby moving the head upwardly toward said normal alignment position between the head and the track of recorded material on the tape, and said electromagnetic means allowing the bias spring to move the plunger upwardly and the head downwardly toward said normal vertical alignment position in response to a decrease in the magnitude of said control signal.

5. Apparatus as in claim 1 wherein said tape is an endless tape having thereon a plurality of horizontal tracks of magnetically recorded information connected with each other through inclined track portions, and wherein said head positioning means includes means responsive to a track switching control signal generated by the vertical position control head element as one of said inclined track portions is moved horizontally past the vertical position control head element to move the head from normal vertical alignment with a track preceding the inclined portion to normal vertical alignment with an adjacent track connected with the preceding track through said inclined track portion.

6. Apparatus as in claim 5 wherein said head positioning means comprises electromagnetic means having a plunger connected to move the head vertically, said electromagnetic means moving the plunger in response to variations in the magnitude of said control signal to urge the head toward said normal vertical alignment position and moving the plunger over a predetermined distance in response to said track switching control signal to move the head from the track preceding said track switching signal to the track connected therewith through said inclined track portion.

7. Apparatus as in claim 6 including a centrally pivoted horizontal lever having one arm connected for moving the head vertically and a bias spring for urging said arm downwardly, means connecting the plunger to the other arm of the lever, said electromagnetic means moving the plunger downwardly in response to an increase in the magnitude of said control signal and thereby moving the head upwardly toward said normal alignment position between the head and the track of recorded material on the tape, said electromagnetic means allowing the bias spring to move the head downwardly and the plunger upwardly in response to a decrease in the magnitude of said control signal, and said electromagnetic means moving the plunger downwardly over a predetermined distance in response to said track switching control signal to move the head from a normal alignment position with a track preceding the track switching control signal to normal alignment position with the next higher track on the tape.

8. Apparatus as in claim 7 wherein said electromagnetic means includes an actuating coil coaxial with the plunger and increasing in diameter downwardly to provide increasing magnetic flux as the plunger is moved downwardly against the force of the bias spring as the head is switched from lower to higher tracks on the tape.

9. Apparatus as in claim 7 for manually setting the plunger at defined positions with respect to the electromagnetic means to thereby set the magnetic head at defined positions with respect to the tape and to select a particular track of recorded material.

10. Apparatus as in claim 9 including a normally closed limit switch interposed between the vertical position control head element and the electromagnetic means, and means for setting the limit switch in a selected relationship with the plunger to cause opening the limit switch by the plunger when the plunger is in selected relationship to the electromagnetic means, thereby limiting selectively the upward movement of the head with respect to the tape.

11. A method of maintaining a normal vertical alignment position between a magnetic head and a recording track of magnetically recorded information on a magnetic tape transported horizontally with respect to said magnetic head, comprising the steps of disposing a vertical position control head element at a defined vertical position with respect to the track when the magnetic head is in said normal vertical alignment position with respect to the track and deriving from said vertical position control head a control signal which varies as a function of the degree and sense of vertical displacement of the vertical position control head element from said defined vertical position thereof with respect to the track, said control signal being distinct and different from any signals provided by said magnetic head, and detecting defined variations in said control signal to move the magnetic head toward said normal vertical alignment position with respect to the track of magnetically recorded information as a function of said variation in the control signal.

12. Method as in claim 11 wherein the step of deriving the control signal includes magnetically reading by means of said vertical position control element the same track of magnetically recorded information with which the magnetic head is at said vertical alignment position.

13. Method as in claim 11 wherein the tape is an endless tape having thereon a plurality of horizontal tracks of magnetically recorded information connected with each other through inclined track portions, and including the step of deriving a track switching control signal by means of said vertical position control head element as one of said inclined track portions is moved horizontally past the vertical position control head element, and the step of moving the magnetic head from its normal vertical alignment position with a track preceding the inclined portion to a normal vertical alignment position with an adjacent track connected with the preceding track through said inclined track portion in response to a track switching control signal generated by said vertical position control head.

14. Method as in claim 13 wherein the step of deriving the control signal includes magnetically reading by means of said vertical position control element the same track of magnetically recorded information with which the magnetic head is at said vertical alignment position.

* * * * *